United States Patent [19]
Watanabe et al.

[11] Patent Number: 5,033,922
[45] Date of Patent: Jul. 23, 1991

[54] APPARATUS FOR DRIVING SPINDLES OF MACHINE TOOLS

[75] Inventors: Koya Watanabe; Takao Date, both of Numazu, Japan

[73] Assignee: Toshiba Kikai Kabushiki Kaisha, Tokyo, Japan

[21] Appl. No.: 271,671

[22] Filed: Nov. 16, 1988

[30] Foreign Application Priority Data

Nov. 20, 1987 [JP] Japan ............................... 62-293500

[51] Int. Cl.$^5$ ............................................. B23C 5/26
[52] U.S. Cl. .................................. 409/233; 279/1 W; 408/239 R
[58] Field of Search .................. 409/233; 279/4, 2 A, 279/1 W, 50, 8; 408/239 R

[56] References Cited

U.S. PATENT DOCUMENTS

| 2,860,547 | 11/1958 | Stephan | 409/233 |
| 4,604,012 | 8/1986 | Kawasaki et al. | 409/233 |
| 4,605,349 | 8/1986 | Bone | 409/233 X |
| 4,836,723 | 6/1989 | Flammini | 409/233 X |

FOREIGN PATENT DOCUMENTS

| 2835965 | 2/1980 | Fed. Rep. of Germany | 279/1 W |
| 199308 | 9/1987 | Japan | 409/233 |
| 405666 | 8/1974 | U.S.S.R. | 409/233 |
| 921765 | 4/1982 | U.S.S.R. | 409/233 |

Primary Examiner—Larry I. Schwartz
Assistant Examiner—Robert Schultz
Attorney, Agent, or Firm—Cushman, Darby & Cushman

[57] ABSTRACT

In apparatus for driving a spindle of a machine tool, the spindle being rotatably supported in a spindle housing and received in a took mounting opening adapted to be inserted with a pull stud at a front end thereof, including a took clamping drawbar provided with a collet for clamping the pull stud at a front end of the drawbar, and a device for axially moving the drawbar, there is provided a device interposed between the inner surface of the spindle and the outer periphery of the drawbar for transmitting a torque from the drawbar to the spindle. The drawbar is connected to a source of drive of the spindle.

1 Claim, 1 Drawing Sheet

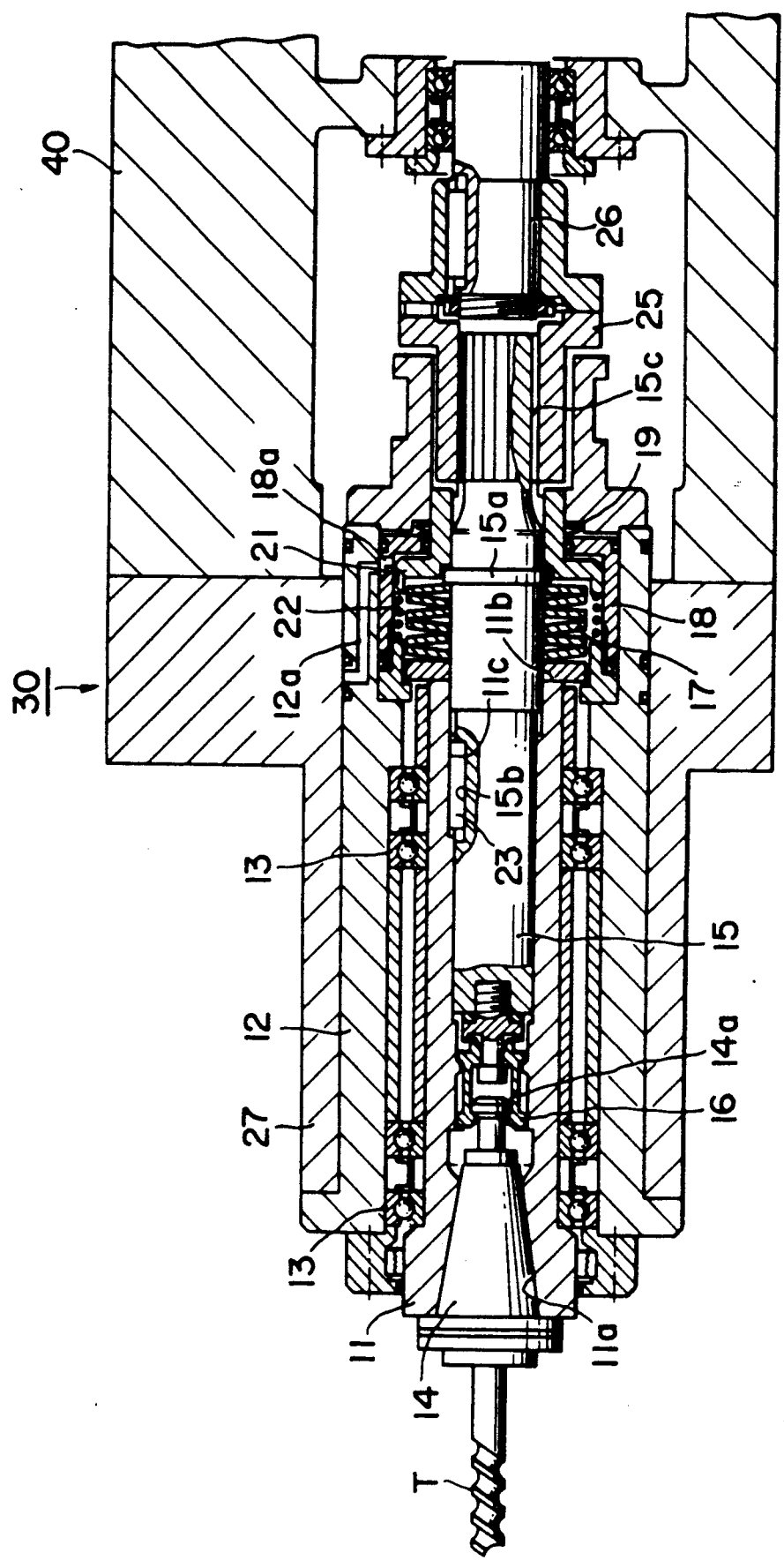

APPARATUS FOR DRIVING SPINDLES OF MACHINE TOOLS

BACKGROUND OF THE INVENTION

This invention relates to apparatus for driving a spindle of a machine tool, and more particularly apparatus for driving the spindle of the attachment exchange type wherein the construction of the apparatus is simplified.

In a machine tool, a working tool has been mounted on the spindle by holding the tool with a tool holder having a pull stud at its one end and by inserting the tool holder into a tool mounting opening formed at a free end of the spindle.

When the tool holder is inserted into the tool mounting opening of the spindle, the tool holder is clamped by a collet disposed in the spindle. Such clamping operation is effected by rearwardly pulling a drawbar mounted on one end of the collet for clamping the tool by dish shaped springs disposed in the spindle. Conversely, for dismounting the tool holder from the spindle the drawbar is moved against the resilient force of the dish shaped springs for disengaging the pull stud from the collet.

The spindle is rotated by a source of spindle drive installed in the machine tool, and the driving force is transmitted to the spindle through a bull gear fitted on the outer periphery of the spindle.

As above described, in the prior art spindle driving apparatus since a gear is fitted on the spindle as means for transmitting a torque to the spindle, it is necessary to arrange a gear meshing with the driving gear in parallel with the axis of the spindle with the result that the mechanism becomes large and complicated. Moreover, since the dish shaped springs are contained in the spindle, the outer diameter of the dish shaped springs must be small so that the number of laminated dish shaped springs would increase which increases the length of the spindle. Alternatively, the dish shaped springs may be positioned at the rear end of the spindle or at a position remote from the rear end. With the former construction there is a defect that the length of a portion to the rear of a gear train meshing with a gear fitted on the spindle increases. In any case, the length of a tool clamping drawbar inserted through the spindle increases.

Furthermore, where a driving apparatus contained in an attachment removably mounted on the ram of a machine tool is used as the driving apparatus of a machine tool, since the available space about the spindle of attachment is limited, the design of the gear device for driving the spindle of attachment becomes difficult and complicated. Since the axial length of the attachment is shortened, the disc shaped springs can be mounted on the upper end of the ram but the construction of the driving shaft in ram becomes complicated.

SUMMARY OF THE INVENTION

It is therefore an object of this invention to provide a novel apparatus for driving a machine tool having a simple construction and small size.

Another object of this invention is to provide a novel apparatus for driving a machine tool especially suitable for use in a spindle driven by a low torque and at a high speed.

A further object of this invention is to provide a novel apparatus for driving a machine tool which can be used as a driving apparatus contained in an attachment.

According to this invention, there is provided apparatus for driving a spindle of a machine tool, the spinle being rotatably supported in a spindle housing and received in a tool mounting opening adapted to be inserted with a tool holder provided with a pull stud at a front end thereof, including a tool clamping drawbar provided with a collet for clamping the pull stud at a front end of the drawbar, and means for axially moving the drawbar, characterized by comprising means interposed between an inner surface of the spindle and an outer periphery of the drawbar for transmitting a torque from the drawbar to the spindle, the drawbar being connected to a source of drive of the spindle.

BRIEF DESCRIPTION OF THE DRAWING

In the accompanying drawing, a single FIGURE is a longitudinal sectional view showing one example of the apparatus for driving the spindle of a machine tool embodying the invention.

DESCRIPTION OF THE PREFERRED EMBODIMENT

In the accompanying drawing, a spindle adapted to support a tool T is designated by a reference numeral 11. The spindle 11 is rotatably supported in a hollow cylindrical spindle housing 12 through a ball bearing 13. The front end of spindle 11 is formed with a frust conical tool mounting opening 11a for receiving a tool holder 14 which holds tool T.

A tool clamping drawbar 15 is inserted in the spindle 11 to be movable in the axial direction. A collet 16 for clamping a pull stud 14a secured to tool holder 14 is secured to the front (left) end of drawbar 15. A flange 15a is provided for an intermediate portion of drawbar 15 at a position to the rear of the rear surface 11b of spindle 11, and a plurality of dish shaped springs 17 are laminated about the periphery of the drawbar between flange 15a and the rear surface 11b of spindle 11.

On the inner surface of spindle housing 12 is disposed a hollow oil pressure cylinder 18 to surround the dish shaped springs 17. The oil pressure cylinder 18 is slidable in the axial direction. So long as no oil pressure is applied the oil pressure cylinder 18 is biased to the front end of spindle 11 by a returning spring 19 disposed to the rear side of oil pressure cylinder 18. Oil pressure supply passages 12a and 18a are formed in spindle housing 12 and oil pressure cylinder 18, respectively.

To the rear of dish shaped springs 17 in oil pressure cylinder 18 is disposed an oil pressure piston 21 to be movable in the axial direction for applying a pressure to dish shaped springs 17. A spring for returning the oil pressure piston 21 is designated by a reference numeral 22.

A key groove 15b is provided for drawbar 15 between a collet 16 and dish shaped springs 17, and a slidable key 23 is provided for spindle 11 to slide in key groove 15b. Splines 15c are formed at the rear end of drawbar 15 to fit in spline grooves formed in a coupling 25 constructed to be movable in the axial direction. The coupling 25 is fitted on a spindle drive shaft 26 connected to a source of spindle drive, not shown.

In this embodiment, spindle 11, spindle housing 12, drawbar 15, etc. are integrally incorporated in the main body 27 of the attachment for obtaining an attachment 30 which is removably mounted on the front end of ram 40 of the machine tool.

The embodiment described above operates as follows.

The drawing shows a state in which tool T is mounted on spindle 11. At this time no pressure oil is supplied into oil pressure cylinder 18 so that the oil pressure cylinder is moved rearwardly by returning spring 22. Drawbar 15 is pulled rearwardly by the force of dish shaped springs 17 so as to clamp pull stud 14a of tool holder 14 by closing collet 16.

Under this state, spindle 11 is driven to work a workpiece, not shown, by tool T and the rotation of spindle drive shaft 26 is transmitted to drawbar 15 through coupling 25 and then to spindle 11 via slidable key 23.

To exchange tool T after completion of machining, oil pressure is applied to the inside of oil pressure cylinder 18 through oil pressure supply passages 12a and 18a for moving oil pressure piston 21 toward the front end of the spindle, whereby flange 15a of drawbar 15 is pushed by oil pressure piston 21 for moving forwardly drawbar 15 against the resilient force of dish shaped springs 17. As a consequence, pull stud 14a is released from collet 16. Then by extracting tool holder 14 in the axial direction by operating a tool exchange arm, not shown, tool T can be withdrawn from spindle 11. Then the tool holder now holding a new tool is inserted into tool mounting opening 11a followed by the release of the oil pressure in oil pressure cylinder 18. Drawbar 15 is again moved rearwardly by the force of dish shaped springs 17 and the pull stud is clamped by collet 16, thus completing the fixing and holding operation of tool holder 14.

As above described according to this embodiment, since the driving force of spindle 11 is transmitted to drawbar 15 via slidable key 23, it is not necessary to fit a driving gear on the peripheral portion of spindle 11 and to provide a gear meshing with the driving gear as in the prior art, thus simplifying and miniaturizing the spindle driving apparatus. Moreover, since dish shaped springs 17 are mounted to the rear side of spindle 11, it is possible to increase the diameter of the dish shaped springs. Thus, it is possible to decrease the axial length of spindle 11 more than a construction wherein a plurality of small diameter dish shaped springs are laminated in spindle 11.

Further, since drawbar 15 can readily be connected and disconnected to and from the spindle driving source through coupling 25, the driving apparatus of this invention can be used for an attachment exchange system. Further, it is possible to simplify the construction of the driving shaft 26.

Although in the foregoing embodiment, a slidable key 23 was provided between drawbar 15 and spindle 11 to act as a torque transmitting mechanism, the slidable key can be substituted by a spline structure. Instead of using a spline structure, a slidable key may be used for interconnecting coupling 25 and drawbar 15.

As above described, according to this invention it is not only possible to simplify and miniaturize a mechanism for transmitting the torque to the spindle but also to decrease the axial length of the spindle.

The invention is especially effective when it is applied to a spindle driven at a low torque and at a high speed. When the driving apparatus of this invention is used as the spindle driving apparatus in an exchangeable attachment, it is possible to make small and simplify the attachment.

What is claimed is:

1. An apparatus for driving a spindle of a machine tool including a spindle housing having a front end and a rear end, a spindle having a front surface and a rear surface, the spindle being rotatably supported in the spindle housing, and a tool mounting opening at the front end of the spindle for receiving a tool holder provided with a pull stud, said apparatus comprising:

driving means for rotating said spindle;

a tool clamping draw bar coaxially extending through said spindle housing, said draw bar having a front end and a rear end, a flange being provided at the rear end of said draw bar and a collet being provided at the front end of the draw bar for clamping said pull stud for securing a tool;

means interposed between said spindle and said draw bar for transmitting rotary motion from said draw bar to said spindle, said means for transmitting rotary motion including a key axially slidably relative to said draw bar and interposed between said spindle and said draw bar;

a plurality of annular shaped laminated spring means interposed between said flange of said draw bar and the rear end of said spindle for biasing said draw bar rearwardly;

an axially slidable coupling means provided between the rear end of said draw bar and a coupling driven by said spindle driving means for rotationally coupling said draw bar to said driving means;

an oil pressure cylinder surrounding said annular shaped springs, and containing a piston adapted to move said draw bar and said flange against the bias of said laminated spring means; and a returning spring for returning said piston upon deactivation of said fluid pressure means.

* * * * *